United States Patent
Ramani et al.

(10) Patent No.: US 10,198,065 B2
(45) Date of Patent: *Feb. 5, 2019

(54) SELECTING A LOW POWER STATE BASED ON CACHE FLUSH LATENCY DETERMINATION

(71) Applicant: Intel Corporation, Santa Clara, CA (US)

(72) Inventors: Sundar Ramani, Bangalore (IN); Arvind Raman, Austin, TX (US); Arvind Mandhani, San Francisco, CA (US); Ashish V. Choubal, Austin, TX (US); Kalyan Muthukumar, Bangalore (IN); Ajaya V. Durg, Austin, TX (US); Samudyatha Chakki, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,625

(22) Filed: Apr. 24, 2017

(65) Prior Publication Data

US 2017/0228014 A1 Aug. 10, 2017

Related U.S. Application Data

(63) Continuation of application No. 14/221,696, filed on Mar. 21, 2014, now Pat. No. 9,665,153.

(51) Int. Cl.
*G06F 1/32* (2006.01)
*G06F 12/0815* (2016.01)
(Continued)

(52) U.S. Cl.
CPC .......... *G06F 1/3287* (2013.01); *G06F 1/3203* (2013.01); *G06F 1/324* (2013.01);
(Continued)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 5,163,153 A 11/1992 Cole et al.
5,522,087 A 5/1996 Hsiang
(Continued)

FOREIGN PATENT DOCUMENTS

EP 1 282 030 A1 5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.
(Continued)

*Primary Examiner* — Zahid Choudhury
(74) *Attorney, Agent, or Firm* — Trop, Pruner & Hu, P.C.

(57) ABSTRACT

In an embodiment, a processor includes a plurality of cores to independently execute instructions, a shared cache coupled to the cores and including a plurality of lines to store data, and a power controller including a low power control logic to calculate a flush latency to flush the shared cache based on a state of the plurality of lines. Other embodiments are described and claimed.

19 Claims, 9 Drawing Sheets

(51) Int. Cl.
  *G06F 12/0804* (2016.01)
  *G06F 12/084* (2016.01)
  *G06F 12/0808* (2016.01)
  *G06F 12/0831* (2016.01)
  *G06F 12/128* (2016.01)
  *G06F 12/0811* (2016.01)

(52) U.S. Cl.
  CPC .......... *G06F 1/3243* (2013.01); *G06F 1/3275* (2013.01); *G06F 1/3296* (2013.01); *G06F 12/084* (2013.01); *G06F 12/0804* (2013.01); *G06F 12/0808* (2013.01); *G06F 12/0815* (2013.01); *G06F 12/0831* (2013.01); *G06F 12/128* (2013.01); *G06F 12/0811* (2013.01); *G06F 2212/1028* (2013.01); *G06F 2212/314* (2013.01); *G06F 2212/621* (2013.01); *G06F 2212/69* (2013.01); *Y02D 10/126* (2018.01); *Y02D 10/13* (2018.01); *Y02D 10/14* (2018.01); *Y02D 10/152* (2018.01); *Y02D 10/172* (2018.01); *Y02D 50/20* (2018.01)

(58) Field of Classification Search
  CPC ....... G06F 1/3289; G06F 1/266; H04L 12/12; H04L 12/10
  See application file for complete search history.

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,813,691 B2 | 11/2004 | Gaither |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 7,752,474 B2 | 7/2010 | Keller |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0079290 A1 | 3/2012 | Kumar |
| 2012/0079304 A1 | 3/2012 | Weissmann |
| 2012/0166731 A1 | 6/2012 | Maciocco |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0346774 A1 | 12/2013 | Bhandaru et al. |
| 2014/0068290 A1 | 3/2014 | Bhandaru et al. |
| 2014/0195829 A1 | 7/2014 | Bhandaru et al. |
| 2014/0208141 A1 | 7/2014 | Bhandaru et al. |
| 2015/0185801 A1 | 7/2015 | Arora |
| 2017/0269669 A1* | 9/2017 | Choi ...................... G06F 1/329 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

Intel Corporation, "Intel 64 and IA-32 Architectures Software Developer's Manual," vol. 3B: System Programming Guide, Part 2,

(56) References Cited

OTHER PUBLICATIONS

Apr. 2016, Chapter 14 Power and Thermal Management (14.1-14.9.5), 42 pages.

* cited by examiner

SELECTING A LOW POWER STATE BASED ON CACHE FLUSH LATENCY DETERMINATION

This application is a continuation of U.S. patent application Ser. No. 14/221,696, filed Mar. 21, 2014, the content of which is hereby incorporated by reference.

FIELD OF INVENTION

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

One issue that arises in connection with efforts to cause a processor to enter into a low power state is that worst case assumptions are made in determining the entry latency and exit latency for a low power state. As a result, oftentimes a processor is prevented from entering into a requested low power state, or any low power state whatsoever.

DETAILED DESCRIPTION

Embodiments provide a hardware-based feedback mechanism to enable optimal low power state selection to account for dynamic cache flush latencies and energy efficiency break even time for a target low power state. That is, instead of assuming a fixed time delay for flushing one or more cache memories (which are not to be provided with a retention voltage during the target low power state), a flush latency may be calculated based on cache state (e.g., dirtiness) at a given time of entry into the target low power state. Then, based at least in part on this latency determination, hardware can determine a cost in terms of energy for flushing the cache (depending upon its state) and compare this cost to the actual power saving of the target low power state.

While some embodiments described herein make this dynamic cache flush latency determination in logic associated with the one or more cache memories and/or a power controller, understand that the scope of the present invention is not limited to these particular hardware locations, and any low power state selection algorithm (either an operating system power management system (OSPM) running on a host processor or firmware running on an on-die microcontroller) can leverage this hardware-based cache flush latency information and incorporate it in a low power state selection process.

Using an embodiment of the present invention, greater power saving opportunities may be realized, as a deeper low power state can be entered when actual an actual flush latency is determined in the course of a low power state selection process, in contrast to using hard coded entry/exit latencies that are based on worst case assumptions about flushing the entire cache. In an example embodiment, a total latency for flushing a cache memory that is only 25% dirty may be approximately half of the total latency for a worst case hard coded value. Embodiments thus provide fine-grained dynamic low power state selection based at least in part on the real time computation of cache flush latency. As such, oftentimes a processor can enter a deeper low power state in which a retention voltage is not provided to some or all of a cache memory (such as a shared cache, e.g., a last level cache (LLC)). That is, instead of not selecting a deeper low power state because a time until a next expected event would not allow such selection per a worst case hard coded value, an embodiment may, based on the dynamic flush latency, select the deeper low power state. In addition to determining whether to enter a given low power state based on the flush latency determination, embodiments may further use cache utilization statistics to determine when it is appropriate not to flush the cache memory, to improve performance.

Figure 1:
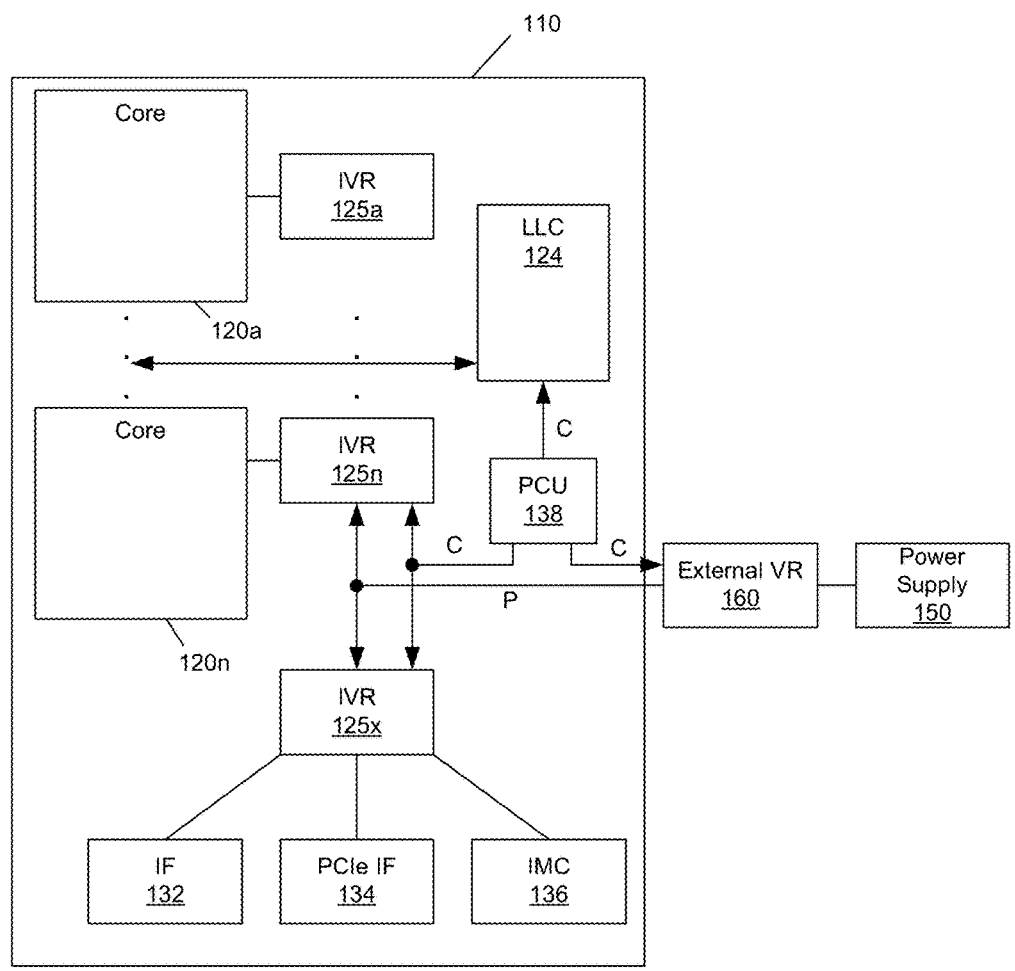
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown in FIG. 1 is a last level cache (LLC) 124 that couples to each of cores 120. In an embodiment, LLC 124 may be a shared cache that can be shared by all the cores and logic within processor 110. Such sharing may be effected by providing dedicated portions of LLC 124 to each core and having an additional shared portion, or in a fully shared manner in which there are no dedicated portions for the given cores. In addition, the size of LLC 124 can be controlled, to realize power management benefits when the full size of the cache is not needed.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to control a size of LLC 124 based on its utilization. Furthermore, PCU 138 may include a logic to dynamically determine a latency for flushing LLC 124. As will be discussed herein, this latency determination may be based on a state of the cache, in that different amounts of flush time may occur depending on the dirtiness of the cache. Furthermore, PCU 138 may also include logic to control power management operations within LLC 124, including dynamic size control of the cache memory, as well as causing the cache memory to be placed into a deep low power state in which a retention voltage is not provided, such that data of one or more given cache coherency states (e.g., a modified state) may first be flushed to system memory prior to removing this retention voltage. And prior to selection of the deep low power state, the logic may dynamically determine this flush latency, and leverage this information in the selection of the appropriate low power state. Note that in other embodiments, the flush latency determination may be performed by logic within LLC 124 upon request from PCU 138.

While not shown for ease of illustration, understand that additional components may be present within processor 110 such as uncore logic, and other components such as internal memories, e.g., one or more additional levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the flush latency determination and concomitant dynamic shared cache memory power control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). In an embodiment, in a C6 or other deep low power state, a retention voltage may not be provided to certain portions of a processor, including a shared cache memory.

Figure 2:
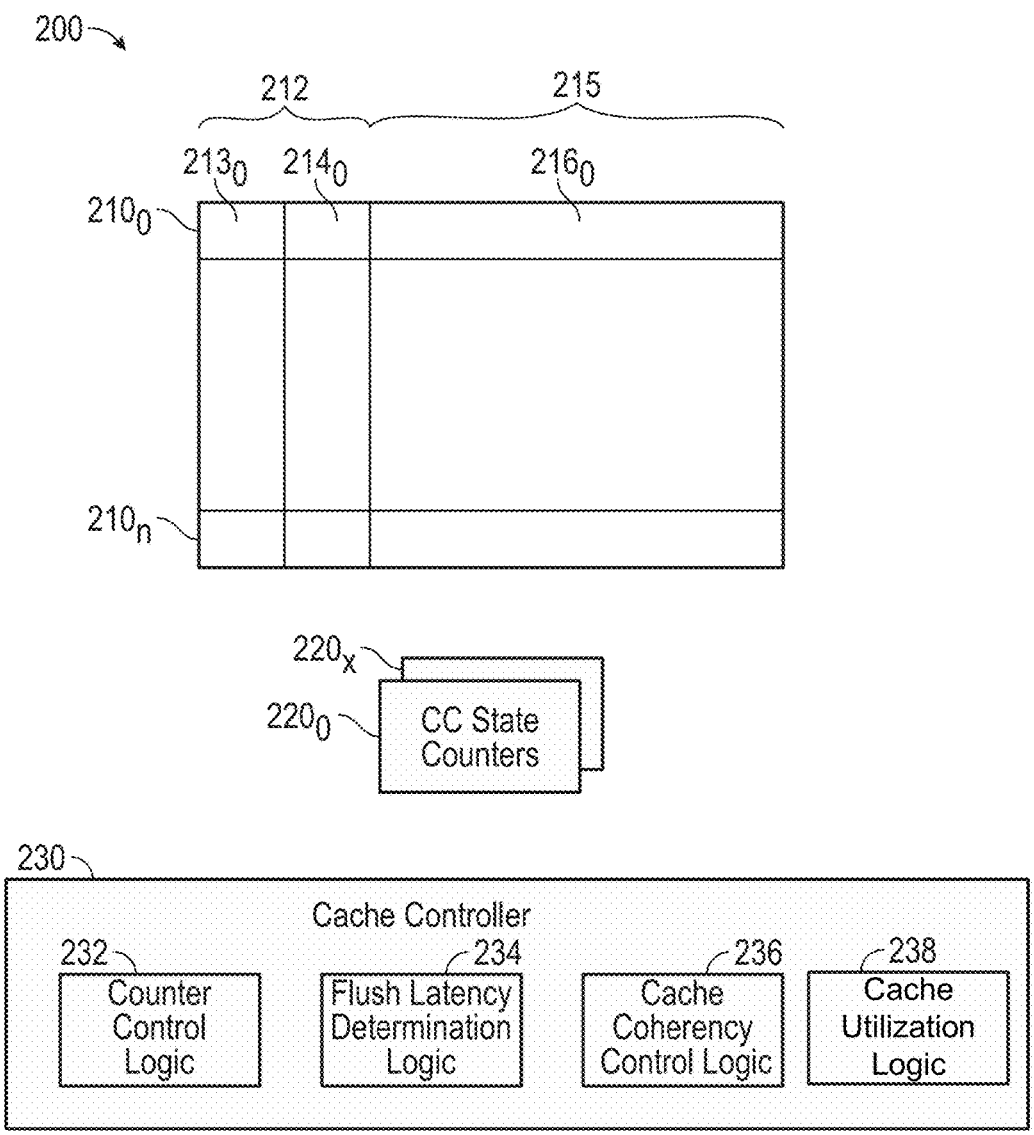
FIG. 2 is a block diagram of a cache memory in accordance with an embodiment of the present invention.

Referring now to FIG. 2, shown is a block diagram of a cache memory in accordance with an embodiment of the present invention. In different processor implementations, cache memory 200 may be located within a core or may be a separate cache memory of a processor to which one or more cores are coupled. In the embodiment shown in FIG. 2, cache memory 200 is a shared cache such as an LLC.

In general, cache memory 200 includes a plurality of cache lines $210_0$-$210_n$. Each cache line 210 includes various fields to store information. For purposes of discussion, FIG. 2 shows a first field 212 configured to store metadata regarding the line including tag information and cache coherency state information, among other such information. In addition, each cache line 210 further includes a data field 215 configured to store one or more data units 216. Understand that the width of cache lines may vary in different embodiments. For example, in one embodiment each cache line may be 256 bytes, however the scope of the present invention is not limited in this regard. In the embodiment shown, field 212 includes a tag portion 213 and a cache coherency state portion 214. For use herein, cache coherency state portion 214 is configured to store a cache coherency state associated with the data stored in the cache line. In one embodiment, the cache coherency state for a cache line may be a cache coherency state selected based on a state of the data. As a particular example, a so-called modified exclusive shared invalid (MESI) cache coherency protocol may be used such that each cache line is controlled to be in a given one of these cache coherency states.

Still referring to FIG. 2, cache memory 200 further includes a set of cache coherency state counters $220_0$-$220_x$. In general, each counter may be associated with a given cache coherency state and may be configured to maintain a count of lines of the cache memory of the associated state. In an embodiment incorporating the MESI cache coherency protocol, four such counters may be provided in an array, each associated with one of the states. In an embodiment, these counters each may be implemented as a register within the cache memory, although other configurations are possible.

In an embodiment, each counter 220 may be incremented when a cache line of the corresponding cache coherency state is written into the cache memory or updated to be in the corresponding cache coherency state. In turn, a counter may be decremented when a line of the corresponding state is evicted from the cache or is changed to another state (in which case the other state's counter is incremented accordingly). To effect maintenance of the cache coherency state counters, cache controller 230 may further include a counter control logic 232.

To enable proper cache operation in light of such cache coherency state, a cache controller 230 may include a cache coherency control logic 236. In general, such cache coherency control logic may be configured to enable selection of the a given cache line, write the appropriate state indicator for the state of the data in corresponding field 214, and further to take appropriate operations with regard to data in the line based on its coherency state (such as responding to snoops and other incoming requests).

Furthermore, as described herein in some embodiments the cache memory 200 may itself determine a flush latency based on a state of the cache memory. In such embodiments, cache controller 230 includes a flush latency determination logic 234 to enable determination of a flush latency for the cache memory based on its dirtiness. To this end, logic 234 may access the values stored in state counters 220 in order to determine an accurate flush latency based on the current cache state. Still further, cache controller 230 may include a cache utilization logic 238 which may be present in certain embodiments to determine whether to allow a flush to occur on entry to a low power state based on an analysis of an extent to which core performance is reliant on use of the cache memory, as will be discussed further below. Although shown at this high level in the embodiment of FIG. 2, understand that embodiments are not so limited and variations are possible.

Figure 3:
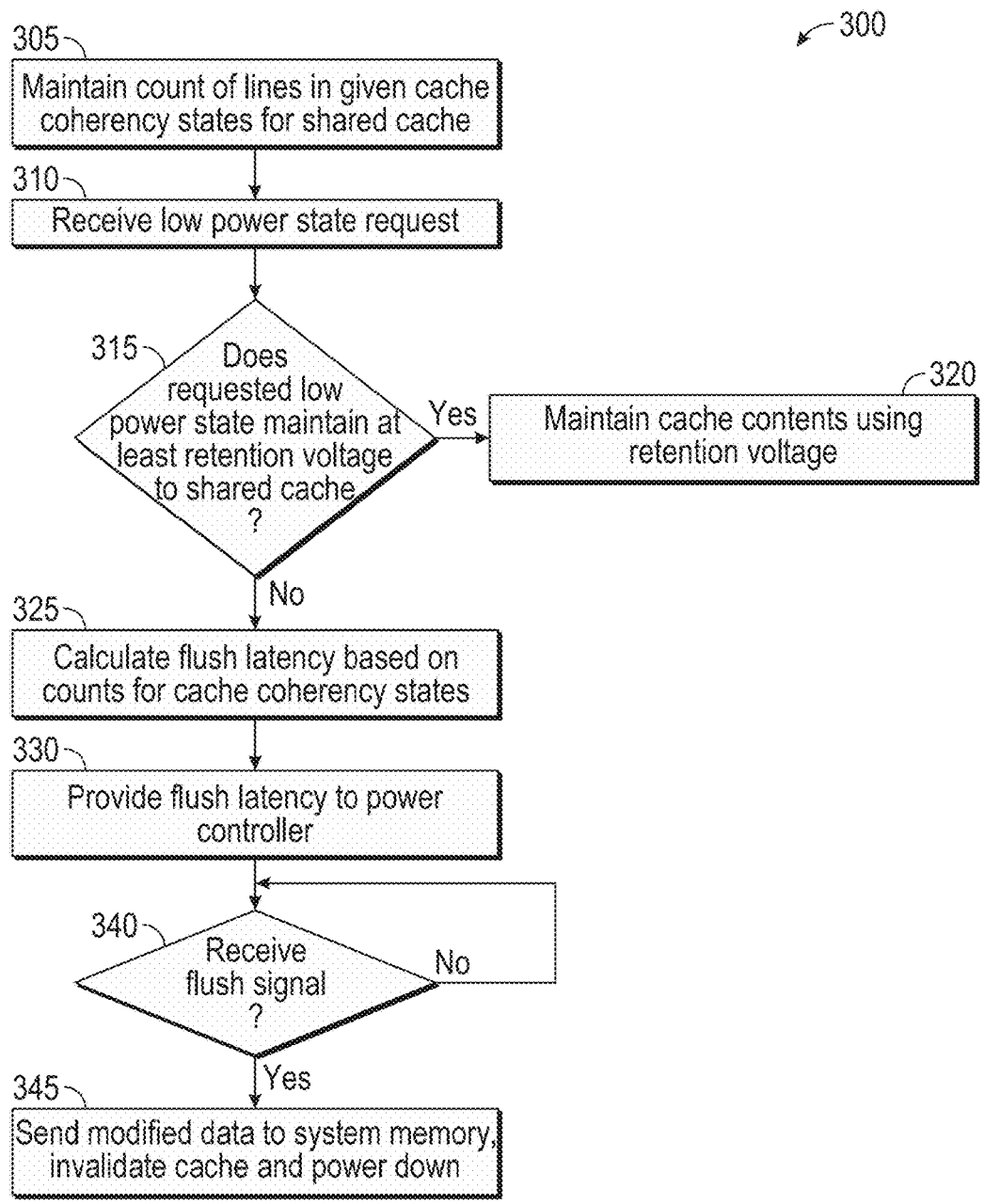
FIG. 3 is a flow diagram of a method in accordance with an embodiment of the present invention.

Referring to FIG. 3, shown is a flow diagram of a method in accordance with an embodiment of the present invention. As shown, method 300 may be used to dynamically determine a flush latency in order to flush a given cache memory, e.g., prior to entry into a deep low power state not providing a retention voltage. In the embodiment of FIG. 3, assume that method 300 is performed by logic of a cache controller. However, the scope of the present invention is not limited in this regard, and the dynamic cache flush latency determination can be performed in other locations of the processor or system, in different embodiments.

Method 300 begins by maintaining a count of lines in given cache coherency state for a cache under analysis, e.g., a shared cache such as an LLC (block 305). As an example, each cache coherency state such as each state of a MESI cache coherency protocol may have an associated counter that is incremented when a line is inserted or updated to the corresponding cache coherency state, and decremented when the cache line is evicted or changed to another cache coherency state.

Next, at block 310 a low power state request is received. For example, a communication may be received in the cache controller from a power controller of a processor such as a PCU or other control logic to indicate that a low power state is imminent. Responsive to this request it can be determined at diamond 315 whether the requested low power state maintains at least a retention voltage to the shared cache. If so, content may be maintained in the cache in the low power state using this retention voltage (block 320).

Otherwise if the request is for a low power state in which a retention voltage is not maintained, control passes to block 325 where a flush latency may be calculated. More specifically, this flush latency may be calculated based on the different cache coherency states. Different manners of using these count values are contemplated. However, for purposes of discussion assume that based on empirical studies, the latency for flushing lines of different coherency states may be determined a priori and accordingly, a weight value may be applied to each of the counts to determine a total flush latency.

In one embodiment, the dynamic flush latency may be determined in accordance with EQ. 1:

Flush Latency=$T$-Cycle*(($N$-Lines-Modified*$N$-Cycles-WritebackInvalidate)+($N$-Lines-SharedExclusive*$N$-Cycles-InvalidateOnly)+($N$-Lines-Total-$N$-Lines-SharedExclusive-$N$-Lines-Modified)*$N$-Cycles-CheckStatus))   [EQ. 1].

where, T-Cycle=a cycle period
N-Lines-Modified=Number of modified lines
N-Cycles-WritebackInvalidate=Number of cycles to write back and invalidate
N-Lines-SharedExclusive=Number of shared and exclusive lines
N-Cycles-InvalidateOnly=Number of cycles to invalidate only
N-Lines-Total=Number of total lines
N-Cycles-CheckStatus=Number of cycles to check the status.

Control next passes to block 330 where this flush latency may be provided to the power controller. Next it may be determined whether a flush signal is received (diamond 340). Such signal may be received when the power controller has determined that an appropriate low power state is one in which no retention voltage is to be provided, and that a flush is to occur before entering into the low power state. Responsive to receipt of such flush signal, control passes to block 345 where the modified data within the cache memory may be sent to system memory. Also, all lines of the cache may be placed into an invalid state. Once the modified data has been sent to system memory, the cache memory may be powered down for the duration of the low power state. Although shown at this high level in the FIG. 3 embodiment, understand the scope of the present invention is not limited in this regard.

Figure 4:
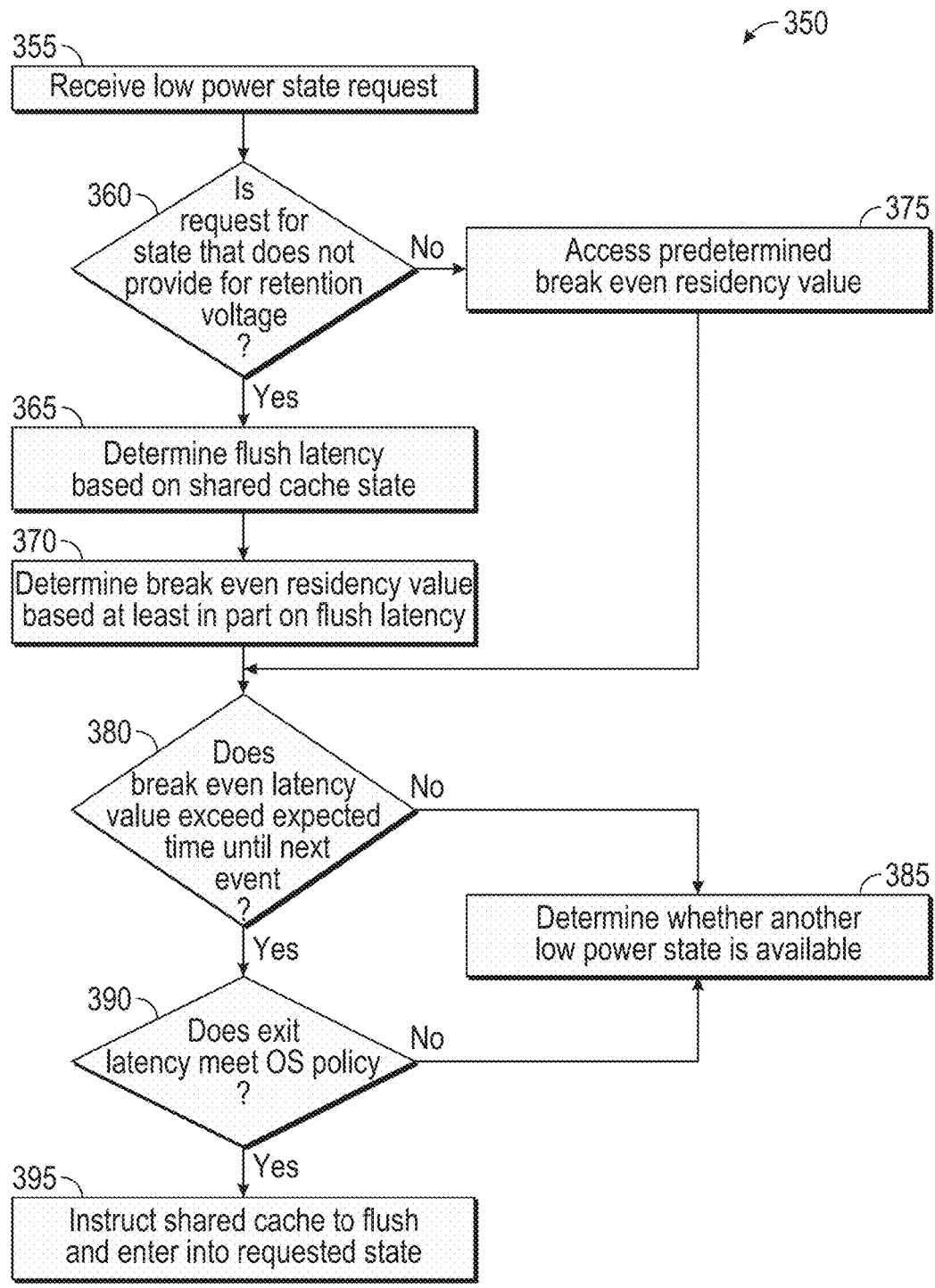
FIG. 4 is a flow diagram of a method in accordance with another embodiment of the present invention.

Referring now to FIG. 4, shown is a flow diagram of a method in accordance with another embodiment of the present invention. In the embodiment of FIG. 4, method 350 may be used to select an appropriate low power state. Note that flush latency is one dynamic criteria used in the analysis of low power state selection; however embodiments are not so limited and in other implementations additional actions to be performed in entry into and exit from a low power state may also be dynamically considered, rather than assuming a worst-case scenario for purposes of low power state selection.

As seen in FIG. 4, method 350 begins by receiving a low power state request (block 355). In an embodiment, this low power state request may be received in a power controller of a processor, e.g., from an OS, which generates the request to indicate that it is idle. In an embodiment, this request may be for a particular low power state. In some embodiments additional information may be provided, including information regarding a latency tolerance, which indicates generally quality of service information for the OS and is used to indicate a latency for low power state exist that is suitable for a given OS workload.

Control passes next to diamond 360 to determine whether the request is for a state that does not provide for a retention voltage (e.g., a deep low power state such as a C6 state). If so, control passes to block 365 where the flush latency may be determined based on the shared cache state. In an embodiment, this determination may be in accordance with method 300 of FIG. 3 discussed above. However, in some implementations the power controller itself may include logic to make this determination based on the hardware counter values as received from the corresponding cache. Of course this determination may take other forms and may be performed by other entities in different embodiments.

Next at block 370 a break even residency value is determined based at least in part on this flush latency. That is, instead of a hard coded, worst-case break even residency time, using the dynamic flush latency determined, a more accurate break even residency value may be determined. In an embodiment, the flush latency value determined may be added to a hard coded value for additional components of break even latency, e.g., obtained from a configuration storage such as a machine specific register (MSR) to determine the break even residency value. Note that in some embodiments, the break even residency value may further include dynamic estimations for one or more of interconnect latencies, memory latencies, cache re-warming latencies post-wakeup, among others. These dynamic estimations may be calculated by similar logic as described herein.

Control next passes to diamond 380 to determine whether this break even latency value exceeds an expected time until a next event. Although the scope of the present invention is not limited in this regard, the next event may be an actual timer-based event such as an interrupt or so forth. Alternately, this expected time may be based on analysis of processor operation that indicates an average asynchronous event occurrence. If the break even latency value does not exceed this expected time, control passes to block 385 where it can be determined whether another low power state is available, given the minimal time until the next expected event. This determination of the other low power state may proceed generally as described here, in an embodiment.

Instead, if the break even latency value does exceed the expected time until the next event, control passes to diamond 390. There it can be determined whether the exit latency meets an OS policy. That is, there is an exit latency associated with exiting a low power state, and based on, e.g., the OS latency information provided with the low power state request, it can be determined whether the exit latency is sufficiently short so as to meet the OS policy requirements. If not, control passes to block 385 discussed above. If however sufficient exit latency time exists, control passes to block 395 where the shared cache may be instructed to flush itself and accordingly, the processor may enter the requested low power state. Understand while shown this particular implementation in the FIG. 4 embodiment, many variations and alternatives are possible.

For example, in another embodiment in addition to this flush latency determination, low power state selection, and flush operation, a cache utilization determination may be made and based on the determination, a flush may be prevented. That is, based on cache utilization statistics (such as the above counts of cache line states), it can be determined how much a core is relying on the cache memory for performance, and in a situation where high reliance is present, a flush may be avoided, e.g., by not entering into a low power state that does not provide a retention voltage. For this analysis, instead of comparing a break even residency with a time until a next event, a core cache utilization (e.g., measured using a number of cache lines (and optionally of particular cache coherency states) used by a give core) can be compared to a cache performance threshold. If it is determined that the utilization exceeds this threshold, a flush may be prevented, and the processor may be controlled to enter a low power state in which a retention voltage is provided to the cache memory (such that a flush does not occur).

Referring now to Table 1, shown is pseudocode for determining whether a requested low power state is suitable based on information regarding break even residency (including dynamic flush latency information) and OS information. In the embodiment shown, information for the determination is obtained at least in part from MSR information; however embodiments may determine or obtain this information from other sources. In general, Table 1 operates to determine whether a retention voltage is provided for a requested low power state, and if not, a break even residency may be compared to an expected time until a next activity (referred to as "time until next tick"). If this break even residency is greater than this expected idle time duration, an exit latency is compared to an OS latency requirement (such as a QoS measure). If both of these comparisons are in the affirmative, the requested low power state is entered. Note that the break even residency and the exit latency may be obtained from MSR's in this example, where the MSR's are dynamically updated using dynamic flush latency and any other actual calculations that improve upon worst case hard coded values.

TABLE 1

```
For (all available C-states) {
    C-state = C-state table [i]
    If (C-state does not retain the LLC) {
        Break even residency = Read MSR from hardware
        Exit latency = Read MSR from hardware
    }
    If (break even residency > time until next tick)
        continue
    If (exit latency > OS latency requirement)
        Continue
} //C-state decision is done
```

Figure 5:
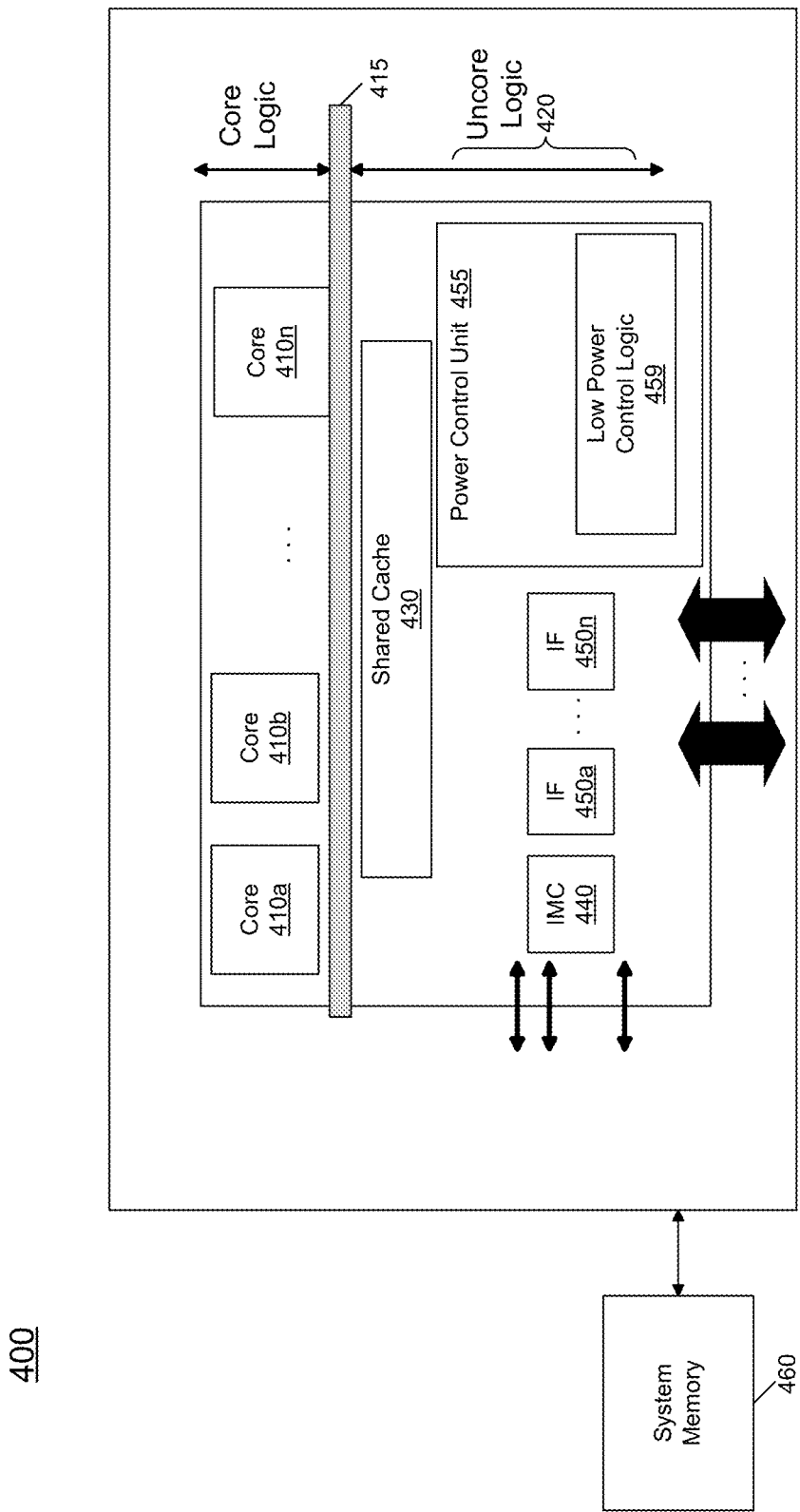
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a low power control logic 459 in accordance with an embodiment of the present invention. Using this logic, a shared cache memory may be polled to determine a flush latency, to enable selection of an appropriate low power state (including selection of a deep low power state in which a retention voltage is not provided to the shared cache memory). In other embodiments, low power control logic 459 may itself calculate the flush latency based on count information received from the shared cache memory regarding residency of lines of the cache memory in various cache coherency states.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
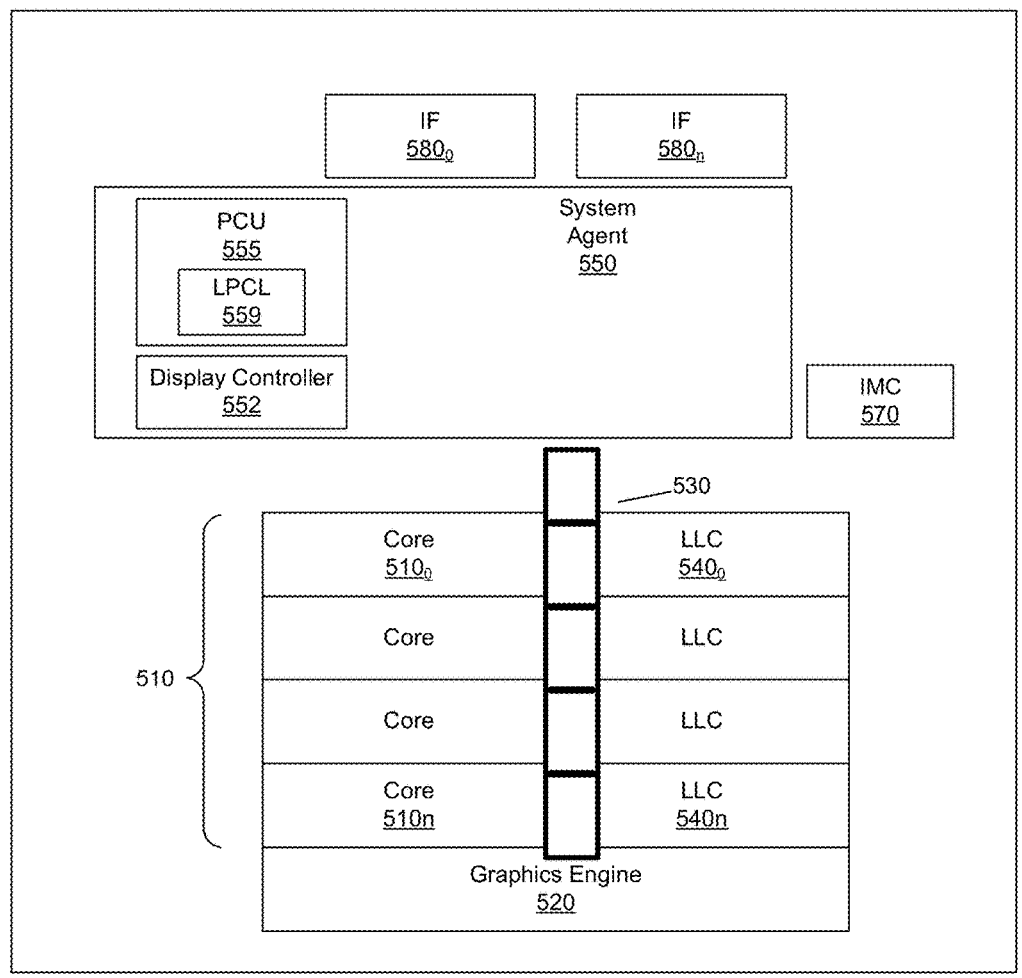
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a low power control logic 559 in accordance with an embodiment of the present invention to dynamically select an appropriate low power state that takes into consideration the flush latency for a shared cache memory such as an LLC, as described herein. In various embodiments, this logic may execute at least portions of the algorithms described above in FIGS. 2 and 3.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
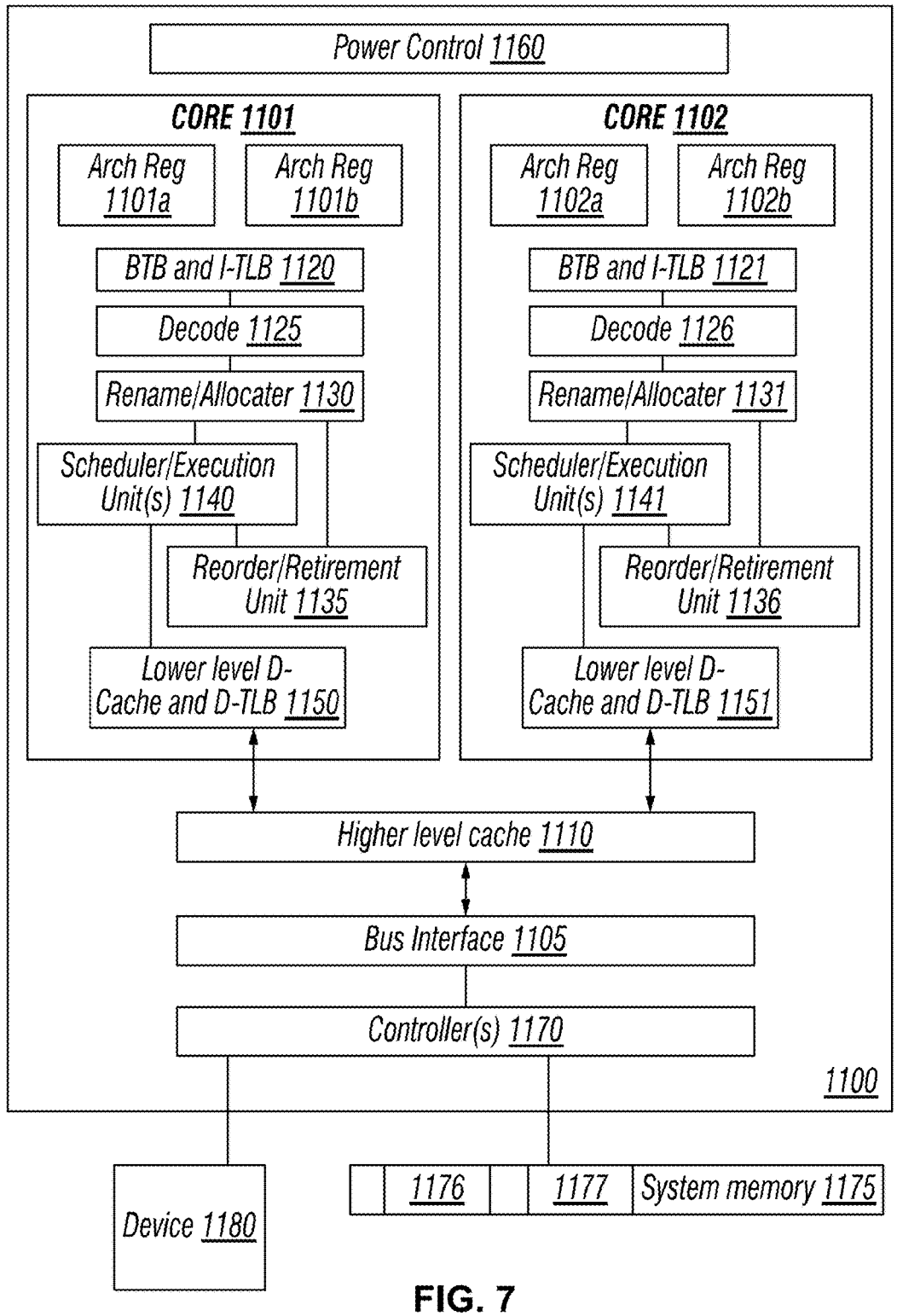
FIG. 7 is a block diagram of a processor including multiple cores in accordance with an embodiment of the present invention.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
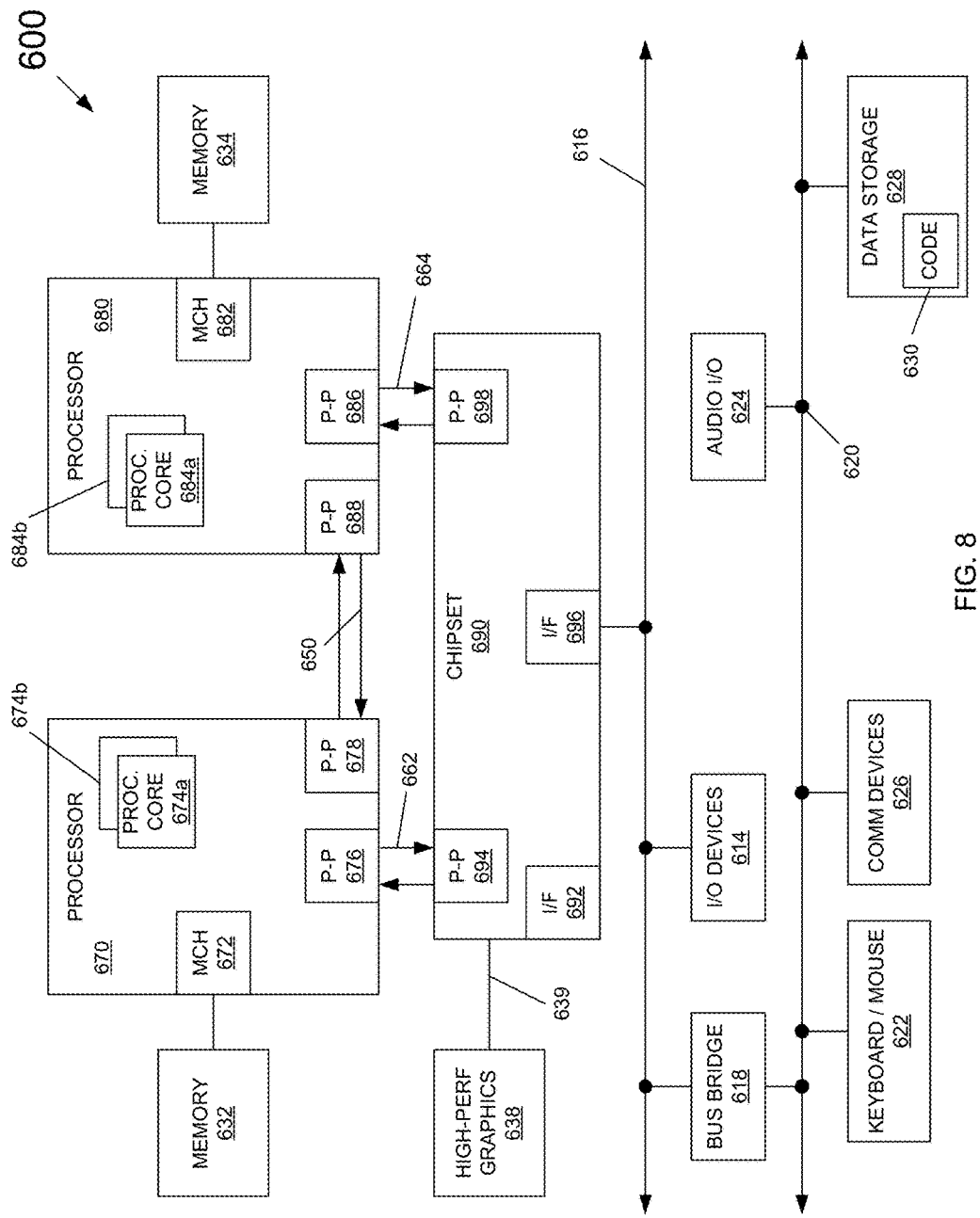
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to select an appropriate low power state based at least in part on a dynamic flush latency determination, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
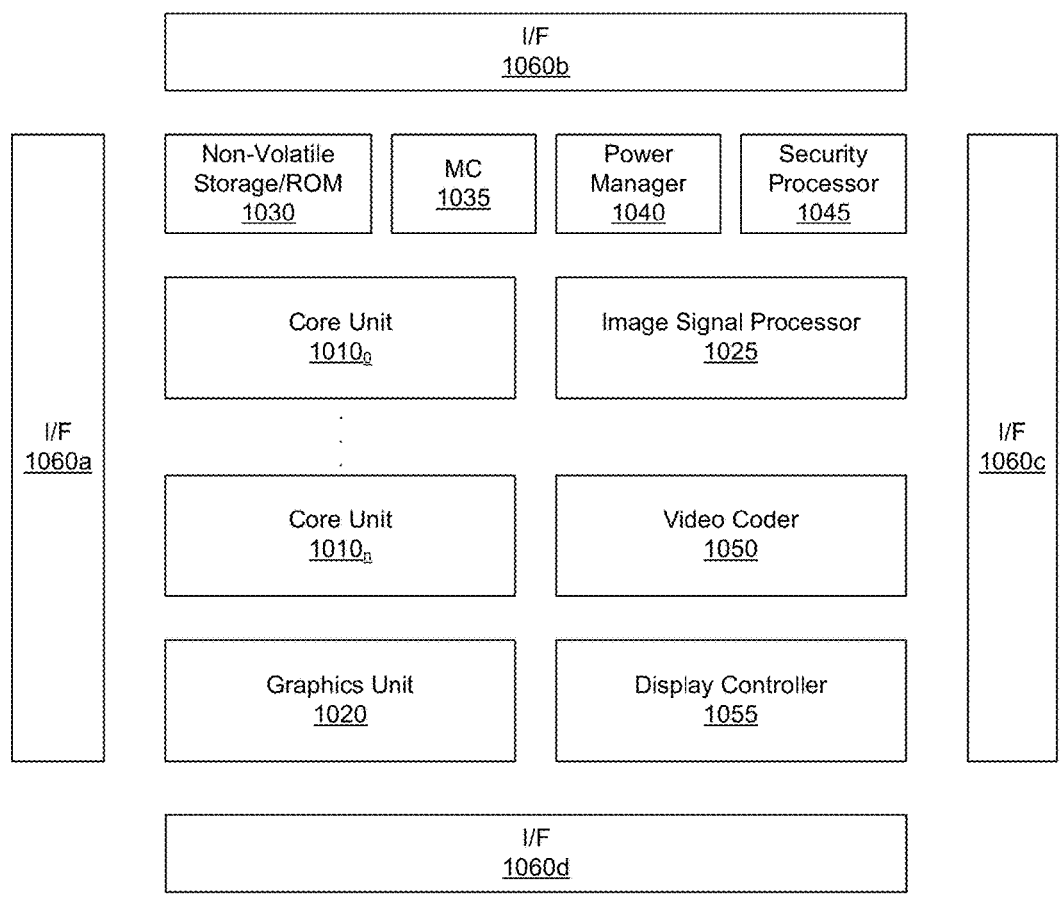
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 1000 includes a plurality of core units $1010_0$-$1010_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 9).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 9, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes control logic to perform selection of a given low power state based at least in part on a dynamic cache flush latency determined as described herein.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™ GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

The following examples pertain to further embodiments.

In one example a processor includes: a plurality of cores to independently execute instructions; a shared cache coupled to the plurality of cores, the shared cache including a plurality of lines to store data; and a power controller including a low power control logic to calculate a flush latency to flush the shared cache based on a state of the plurality of lines.

In an example, the processor further includes a plurality of counters, each counter associated with a cache coherency state and to maintain a count of the plurality of lines of the shared cache having the associated cache coherency state. In turn, the low power control logic may calculate the flush latency based at least in part on the count of the plurality of counters. In an example of the flush latency calculation, the low power control logic is to weight lines having a modified state greater than lines having a shared state.

In an example, the low power control logic is to determine a break even residency time for a requested low power state based at least in part on the flush latency. The low power control logic may enable the processor to enter into the requested low power state if the break even residency time is greater than a duration until an anticipated wakeup event time. The low power control logic may also cause the processor to enter into a different low power state than the requested low power state if the break even residency time is less than the duration. In an example, lines of the plurality of lines having a modified state are to be flushed to a system memory prior to entry into the requested low power state.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a processor includes: a plurality of cores each to independently execute instructions and each having a private cache memory; a shared cache memory coupled to the plurality of cores, the shared cache memory including a plurality of lines, each line having a first field to store a cache coherency indicator corresponding to a cache coherency state of a cache coherency protocol for data stored in a second field of the line; a counter storage including a plurality of counters each to maintain a count of lines of the plurality of lines associated with each cache coherency state; and a logic to calculate a latency to flush the shared cache memory based at least in part on the count of at least some of the plurality of counters.

In an example, the logic is to increment a first counter of the plurality of counters associated with a first cache coherency state when a first line is updated to the first cache coherency state. In turn, the logic is to decrement a second counter of the plurality of counters associated with a second cache coherency state when the first line is updated to the first cache coherency state from the second cache coherency state. The logic may apply a first latency value to the count of a first counter associated with a modified cache coherency state and apply a second latency value to the count of a second counter associated with a shared cache coherency state, where the first latency value is greater than the second latency value.

In an example, a power controller coupled to the logic may request the latency responsive to a request for a first low power state in which a retention voltage is not provided to the shared cache memory. The power controller may determine a break even residency value based at least in part on the latency and enable the processor to enter into the first low power state if the break even residency value exceeds a time duration until a next expected event. The power controller may cause the shared cache memory to flush lines of a modified cache coherency state prior to entry into the first low power state. In an example, the power controller may enable the processor to enter into a second low power state if the break even residency value does not exceed the time duration, where the retention voltage is provided to the shared cache memory in the second low power state.

In an example, a second logic may determine a cache utilization value for a first core and compare the cache utilization value to a performance threshold. In turn, a power controller coupled to the second logic may prevent the shared cache memory from being flushed if the cache utilization value exceeds the performance threshold. The power controller may enable the processor to enter into a low power state in which a retention voltage is provided to the shared cache memory if the cache utilization value exceeds the performance threshold.

In another example, a machine-readable medium has stored thereon instructions, which if performed by a machine cause the machine to perform a method comprising: maintaining a count of cache lines for each of a plurality of cache coherency states of a cache memory of a processor; calculating a flush latency for flushing the cache memory based at least in part on the count for one or more of the plurality of cache coherency states; and responsive to a low power state request, selecting a low power state for the processor to enter based at least in part on the flush latency.

In an example, the method further comprises determining a break even value based at least in part on the flush latency. The method may further include determining whether an exit latency from a first low power state meets a policy requirement, if the break even value exceeds an expected idle duration. The method further comprises causing the processor to enter a requested low power state of the low power request if the break even value exceeds the expected idle duration and the exit latency meets the policy requirement, and otherwise determining whether another low power state is available for the processor, in an example.

In an example, the method further comprises calculating the flush latency by applying a first coefficient to the count of a first counter associated with a modified cache coherency state and applying a second coefficient to the count of a second counter associated with a shared cache coherency state. Maintaining the count may include, in an example, incrementing the count of the first counter when a first line of the cache memory is updated to the modified cache coherency state, and decrementing the count of the second counter when a shared cache line is evicted from the cache memory.

In another example, a computer readable medium including instructions is to perform the method of any of the above examples.

In another example, an apparatus comprises means for performing the method of any one of the above examples.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores to independently execute instructions;
a shared cache coupled to the plurality of cores, the shared cache including a plurality of lines to store data; and
a power controller including a low power controller to determine a low power state for the processor to enter based at least in part on a flush latency to flush the shared cache, a break even residency time for a first low power state and an anticipated wakeup event time, enable the processor to enter into the first low power state if the break even residency time is greater than a duration until the anticipated wakeup event time and instead cause the processor to enter into a different low power state than the first low power state if the break even residency time is less than the duration.

2. The processor of claim 1, further comprising a plurality of counters, each counter associated with a cache coherency state and to maintain a count of the plurality of lines of the shared cache having the associated cache coherency state.

3. The processor of claim 2, wherein the low power controller is to calculate the flush latency based at least in part on the count of the plurality of counters.

4. The processor of claim 3, wherein in the flush latency calculation, the low power controller is to weight lines having a modified state greater than lines having a shared state.

5. The processor of claim 1, wherein lines of the plurality of lines having a modified state are to be flushed to a system memory prior to entry into the requested low power state.

6. A processor comprising:
a plurality of cores each having a private cache memory;
a shared cache memory coupled to the plurality of cores, the shared cache memory including a plurality of lines, at least some of the plurality of lines having a first field to store a cache coherency indicator corresponding to a cache coherency state of data stored in a second field of the line;
a counter storage including a plurality of counters to maintain a count of lines of the plurality of lines associated with the plurality of cache coherency states;
a logic to calculate a latency to flush the shared cache memory based at least in part on the count of at least some of the plurality of counters; and
a power controller to determine a break even residency value for a target low power state based at least in part on the latency and to enable the processor to enter into the target low power state based on a first result of a comparison of the break even residency value to a time duration until a next expected event, and to enable the processor to enter into a second low power state based on a second result of the comparison of the break even residency value to the time duration, wherein a retention voltage is provided to the shared cache memory in at least the second low power state.

7. The processor of claim 6, wherein the logic is to increment a first counter of the plurality of counters associated with a first cache coherency state when a first line is updated to the first cache coherency state.

8. The processor of claim 7, wherein the logic is to decrement a second counter of the plurality of counters associated with a second cache coherency state when the first line is updated to the first cache coherency state from the second cache coherency state.

9. The processor of claim 6, wherein the logic is to apply a first latency value to the count of a first counter associated with a modified cache coherency state and apply a second latency value to the count of a second counter associated with a shared cache coherency state, wherein the first latency value is greater than the second latency value.

10. The processor of claim 6, wherein the power controller is coupled to the logic to request the latency responsive to a request for the first low power state in which the retention voltage is not provided to the shared cache memory.

11. The processor of claim 6, wherein the power controller is to cause the shared cache memory to flush lines of a modified cache coherency state prior to entry into the first low power state.

12. The processor of claim 6, further comprising a second logic to determine a cache utilization value for a first core and to compare the cache utilization value to a performance threshold.

13. The processor of claim 12, wherein the power controller is coupled to the second logic, wherein the power controller is to prevent the shared cache memory from being flushed if the cache utilization value exceeds the performance threshold.

14. The processor of claim 13, wherein the power controller is to enable the processor to enter into a low power state in which the retention voltage is provided to the shared cache memory if the cache utilization value exceeds the performance threshold.

15. A non-transitory machine-readable medium having stored thereon instructions, which if performed by a machine cause the machine to perform a method comprising:
   maintaining a count of cache lines for each of a plurality of cache coherency states of a cache memory of a processor;
   determining a flush latency for flushing the cache memory;
   after determining the flush latency, determining a break even value based at least in part on the flush latency;
   responsive to a low power state request, selecting from a plurality of low power states a low power state for the processor to enter based at least in part on the flush latency, the break even value and an expected idle duration; and
   causing the processor to enter a requested low power state of the low power state request based on a comparison of the break even value to the expected idle duration, and otherwise determining whether another low power state is available for the processor.

16. The non-transitory machine-readable medium of claim 15, wherein the method further comprises determining the flush latency based at least in part on the count for at least two of the plurality of cache coherency states.

17. The non-transitory machine-readable medium of claim 15, wherein the method further comprises calculating the flush latency by applying a first coefficient to the count of a first counter associated with a modified cache coherency state and applying a second coefficient to the count of a second counter associated with a shared cache coherency state.

18. The non-transitory machine-readable medium of claim 17, wherein maintaining the count comprises:
   incrementing the count of the first counter when a first line of the cache memory is updated to the modified cache coherency state; and
   decrementing the count of the second counter when a shared cache line is evicted from the cache memory.

19. The non-transitory machine-readable medium of claim 15, wherein the method further comprises, after determining the break even value, determining whether an exit latency from a first low power state meets a policy requirement.

* * * * *